(12) United States Patent
Cavaliere et al.

(10) Patent No.: US 9,166,681 B2
(45) Date of Patent: Oct. 20, 2015

(54) DETERMINING ASYMMETRIES IN A COMMUNICATION NETWORK

(75) Inventors: Fabio Cavaliere, Vecchiano (IT); Giulio Bottari, Livorno (IT); Luca Giorgi, Ponsacco (PI) (IT); Stefano Ruffini, Rome (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 47 days.

(21) Appl. No.: 13/879,147

(22) PCT Filed: Sep. 13, 2011

(86) PCT No.: PCT/EP2011/065844
§ 371 (c)(1),
(2), (4) Date: Apr. 12, 2013

(87) PCT Pub. No.: WO2012/048975
PCT Pub. Date: Apr. 19, 2012

(65) Prior Publication Data
US 2013/0202291 A1    Aug. 8, 2013

Related U.S. Application Data

(60) Provisional application No. 61/392,744, filed on Oct. 13, 2010.

(30) Foreign Application Priority Data

Apr. 8, 2011  (EP) .................................... 11161744

(51) Int. Cl.
*H04B 10/077* (2013.01)
*H04B 10/079* (2013.01)
(Continued)

(52) U.S. Cl.
CPC ............ *H04B 10/0775* (2013.01); *H04B 10/07* (2013.01); *H04B 10/0795* (2013.01);
(Continued)

(58) Field of Classification Search
CPC .......... H04L 43/0864; H04B 10/0775; H04B 2210/072; H04B 2210/078; H04J 14/0275; H04J 14/0273; H04J 3/0667
USPC .......................................................... 398/31
See application file for complete search history.

(56) References Cited

U.S. PATENT DOCUMENTS

2006/0098575 A1*  5/2006  Lee ............................... 370/237
2007/0002748 A1*  1/2007  Nakata et al. ................. 370/238
(Continued)

FOREIGN PATENT DOCUMENTS

CN           1773965 A        5/2006
CN           101043451        9/2007
(Continued)

OTHER PUBLICATIONS

ITU-T G.650, Series G: Transmission Systems and Media, Digital Systems and Networks, Transmission Media Characteristics—Optical Fibre Cables, Definition and Test Methods for the Relevant Parameters of Single-Mode Fibres, International Telecommunication Union, Apr. 1997.

(Continued)

*Primary Examiner* — Leslie Pascal
(74) *Attorney, Agent, or Firm* — Baker Botts, LLP

(57) ABSTRACT

A method for measuring asymmetry in propagation delay of first and second links which connect a first node to a second node of a communication network. The method comprises measuring (101) a round trip delay of the first link. The round trip delay can be measured by transmitting (102) a test signal from the first node to the second node over the first link and receiving a reply to the test signal from the second node over the first link. The method further comprises measuring (105) a round trip delay of the second link. The round trip delay can be measured by transmitting (106) a test signal to the second node over the second link and receiving a reply to the test signal from the second node over the second link. A difference in the propagation delay of the first link with respect to the second link is determined (109) using the measured round trip delays of the first link and the second link.

19 Claims, 14 Drawing Sheets

(51) Int. Cl.
*H04B 10/07* (2013.01)
*H04J 3/06* (2006.01)
*H04L 12/26* (2006.01)
*H04J 14/02* (2006.01)

(52) U.S. Cl.
CPC .......... *H04J3/0667* (2013.01); *H04J 14/0226* (2013.01); *H04J 14/0267* (2013.01); *H04J 14/0275* (2013.01); *H04L 43/0864* (2013.01); *H04B 2210/072* (2013.01); *H04B 2210/078* (2013.01); *H04J 14/021* (2013.01); *H04J 14/0201* (2013.01); *H04J 14/0273* (2013.01)

(56) References Cited

U.S. PATENT DOCUMENTS

| | | |
|---|---|---|
| 2007/0223537 A1 | 9/2007 | Crowle et al. |
| 2008/0052583 A1 | 2/2008 | Matteson et al. |
| 2008/0240077 A1 | 10/2008 | Freiberger |
| 2009/0060498 A1 | 3/2009 | Libeskind et al. |
| 2011/0170860 A1* | 7/2011 | Smith et al. .............. 398/25 |
| 2011/0286361 A1* | 11/2011 | Li et al. .................... 370/255 |
| 2012/0017121 A1* | 1/2012 | Carlson et al. ............ 714/43 |

FOREIGN PATENT DOCUMENTS

| | | |
|---|---|---|
| EP | 0 390 320 | 10/1990 |
| EP | 1 206 067 | 5/2002 |
| EP | 1 657 863 | 5/2006 |
| EP | 1 855 397 | 11/2007 |
| GB | 2 253 533 | 9/1992 |
| WO | 2005/122509 A1 | 12/2005 |
| WO | WO 2011/079460 | 7/2011 |

OTHER PUBLICATIONS

IEEE Standard for a Precision Clock Synchronization Protocol for Networked Measurement and Control Systems, IEEE Instrumentation and Measurement Society, IEEE Std 1588, Jul. 24, 2008.
ITU-T G.8261, Series G: Transmission Systems and Media, Digital Systems and Networks, Packet Over Transport Aspects—Quality and Availability Targets, Timing and Synchronization Aspects in Packet Networks, International Telecommunication Union, Apr. 2008.
ITU-T G.813, Series G: Transmission Systems and Media, Digital Systems and Networks, Digital Networks—Design Objectives for Digital Networks, Timing Characteristics of SDH Equipment Slave Clocks (SEC), International Telecommunication Union, Mar. 2003.
ITU-T G.8262, Series G: Transmission Systems and Media, Digital Systems and Media, Digital Systems and Networks, Packet over Transport Aspects—Quality and Availability Targets, Timing Characteristics of a Synchronous Ethernet Equipment Slave Clock (EEC), International Telecommunication Union, Jan. 2010.
ITU-T G.652, Series G: Transmission Systems and Media, Digital Systems and Networks, Transmission Media and Optical Systems Characteristics—Optical Fibre Cables, Characteristics of a Single-Mode Optical Fibre and Cable, International Telecommunication Union, Nov. 2009.
European Office Action cited issue in Application Serial No. 11757842.7 dated Jun. 20, 2014.
Russian Office Action mailed Jul. 30, 2014 in Russian Application 2013119978/07(0293573).
Gurewitz et al., "Estimating one-way delays from cyclic-path delay measurements", *Proceedings IEEE Infocom 2001*, vol. 2, Apr. 22, 2001, pp. 1038-1044.
International Search Report for PCT/EP2011/065844, mailed Feb. 6, 2012.
EP Office Action mailed Jun. 20, 2014 in EP Application 11757842.7.
First Office Action issued by the State Intellectual Property Office, P.R. China for Patent Application No. 201180049387.4 Feb. 28, 2015.

* cited by examiner

DETERMINING ASYMMETRIES IN A COMMUNICATION NETWORK

This application is the U.S. national phase of International Application No. PCT/EP2011/065844 filed 13 Sep. 2011 which designated the U.S. and claims priority to US Provisional Application No. 61/392,744 filed 13 Oct. 2010 and EP Application No. 11161744.5 filed 8 Apr. 2011, the entire contents of each of which are hereby incorporated by reference.

FIELD

This invention relates to a communication network, such as an optical communication network, and to determining asymmetries between links of the network.

BACKGROUND

There are a number of applications requiring accurate frequency and/or time synchronization references in order to properly operate, for example mobile technologies such as Global System for Mobile Communications (GSM), Wideband Code Division Multiple Access (W-CDMA) and in the future Long Term Evolution (LTE). In case of frequency synchronization the traditional solution is to get synchronization from a synchronous stream of data, as for instance in case of Time-Division Multiplexed (TDM) based networks, but the migration of networks from TDM to packet-based technologies (such as Ethernet) requires a different approach.

One solution is to use a packet based method, where the timing is carried across a packet network by sending packets containing timestamp information. The timestamps are generated by a master (server) that has access to an accurate reference, such as Global Positioning System (GPS).

Each receiving system can run an algorithm that recovers the timing based on adaptive clock recovery methods, e.g. by comparing the local timing with the inter-arrival times of the packets (see ITU-T G.8261). The accuracy of the recovered clock is therefore affected by variable delays in the network, and one of the key requirements of the algorithm is to filter out the packet delay variation.

When time synchronization is requested, a two-way timing protocol is required (e.g. Network Time Protocol (NTP) or Precision Time Protocol (PTP)). The transfer delay from master to slave is calculated. One fundamental assumption with this approach is that the delay from master to slave and from slave to master shall be identical. This means that any asymmetry in the network would significantly impact the performance of the delivered time synchronization reference.

As an example, the scheme shown in FIG. 1 relates to the time distribution via the PTP protocol (IEEE1588). Similar discussion applies with other protocols such as NTP. The message exchange pattern is:

The master sends a Sync message to the slave and notes the time, t1, at which it was sent.
The slave receives the Sync message and notes the time of reception, t2.
The master conveys to the slave the timestamp t1 by:
Embedding the timestamp t1 in the Sync message. This requires some sort of hardware processing for highest accuracy and precision, or
Embedding the timestamp t1 in a Follow_Up message.
The slave sends a Delay_Req message to the master and notes the time, t3, at which it was sent.
The master receives the Delay_Req message and notes the time of reception, t4.
The master conveys to the slave the timestamp t4 by embedding it in a Delay_Resp message.

At the conclusion of this exchange of messages, the slave possesses all four timestamps. These timestamps may be used to compute the offset of the slave's clock with respect to the master and the mean propagation time of messages between the two clocks, which in FIG. 1 is the mean of t-ms and t-sm. The slave shall synchronize to its master via the minimization of the <offsetFromMaster> value computed by the slave. The time error between a slave and master ordinary or boundary clock (<offsetFromMaster>) is defined as:

<offsetFromMaster>)=<Time on the slave clock>-<Time on the master clock> where all times are measured at the same instant.

In particular, the <offsetFromMaster> value shall be computed by the slave as follows:
If a Follow_Up message will not be received, then
<offsetFromMaster>=(t2-t1)-<meanPathDelay>-correctionField of Sync message.
If a Follow_Up message will be received, then
<offsetFromMaster>=(t2-t1)-<meanPathDelay>-correctionField of Sync message-correctionField of Follow_Up message where correction field of Sync message relates to the support in the transport network (i.e. Transparent Clocks adding information on the latency for the packet crossing the transport network element).

The nominal value of the <meanPathDelay> is computed as $$<\text{meanPathDelay}>=[(t_2-t_1)+(t_4-t_3)]/2=[(t_2-t_3)+(t_4-t_1)]/2$$

The scheme is slightly different in case of Peer-to-Peer Transparent clocks where the Path delay is calculated at each hop and included in the correction field of the sync message (or Follow-up message in case of 2-steps clock) in addition to the latency.

From the above description it can be seen that the computation of offset and propagation time assumes that the master-to-slave and slave-to-master propagation times are equal. Any asymmetry in propagation time introduces an error in the computed value of the clock offset. The computed mean propagation time differs from the actual propagation times due to the asymmetry.

If the delay asymmetry of the path connected to the ingress port is known, the corrections can be made as specified by the PTP protocol.
In particular IEEE 1588 defines the attribute "delayAsymmetry" as follows for t-ms and t-sm:

tms=<meanPathDelay>+delayAsymmetry tsm=<meanPathDelay>-delayAsymmetry

In other words, delayAsymmetry is defined to be positive when the master-to-slave or responder-to requestor propagation time is longer than the slave-to-master or requestor-to-responder propagation time.

In order to handle the packet delay variation and the asymmetries in the network the "Boundary Clock" or "Transparent Clock" functions have been specified by IEEE 1588.

The IEEE 1588 transparent clock is a function that provides a means of measuring the delay that has been added by the network element and of measuring the delays on links connected to the network element. The end-equipment can use this information to recover the time reference.

The boundary clock, by contrast, terminates and regenerates timestamp packets. While any asymmetry in the node is effectively removed by means of the HW timestamping at the ingress and egress ports, still asymmetries may be present in the links connecting two nodes.

This may happen in case of forward and reverse traffic (and therefore PTP flow) in the same fibre but over different wavelength (e.g. WDM-PON) or in case of forward and reverse traffic in two different fibres (and using the same wavelength), therefore with different transmission characteristics and different length.

The accuracy of phase/time synchronization required by mobile networks is typically in the order of microseconds. This implies that the requirements for technologies such as IEEE 1588v2 to provide precise phase/time over transport networks require that the handling of any source for asymmetry is controlled at the ns level.

In order to remove the asymmetries in the links, currently the only solution is to manually calibrate the links. If the delay asymmetry of the path connected to the ingress port is known, the corrections can be made as specified by the PTP protocol.

This must be performed node-by-node and can be an extremely costly and time consuming process. Moreover, at any change in the network (e.g. adding transmission equipments) the compensation has to be updated. This can be a too complex and costly task creating a significant obstacle in the deployment of the IEEE1588 technology.

SUMMARY

A method is described for measuring asymmetry in propagation delay of first and second links which connect a first node to a second node of a communication network.

The method comprises measuring a round trip delay of the first link. The round trip delay can be measured by transmitting a test signal from the first node to the second node over the first link and receiving a reply to the test signal from the second node over the first link.

The method further comprises measuring a round trip delay of the second link. The round trip delay can be measured by transmitting a test signal to the second node over the second link and receiving a reply to the test signal from the second node over the second link.

The method further comprises determining a difference in the propagation delay of the first link with respect to the second link using the measured round trip delays of the first link and the second link.

The method can comprise measuring a processing delay incurred at the second node between receiving the test signal and sending a reply to the test signal. The method can use the processing delay when determining a difference in the propagation delay of the first link with respect to the second link.

The method can also comprise a step of measuring a delay incurred in a transmission path at the second node. The method can also comprise a step of measuring delay incurred in a transmission path at the first node. The measured delay at a node can be delay caused by a component such as an optical amplifier, dispersion compensation fibre (DCF) or any other component in the transmission path which may affect the calculation of difference in propagation delay.

Measurements can be made at any suitable wavelength. Measurements can be performed using a dedicated wavelength, such a wavelength dedicated to measurement purposes. This wavelength can be the wavelength used to carry the Optical Supervisory Channel (OSC) or any other suitable wavelength outside a transmission band of an optical amplifier or other optical component at a node. It is also possible to perform measurements at a wavelength within the transmission band of an optical amplifier, such as one or more of the wavelengths normally used to carry traffic channels. The measurements can be performed while the wavelength is carrying traffic, such as by using overhead information.

The method can determine a difference in the propagation delay of the first link with respect to the second link at a first wavelength and can then determine a difference in the propagation delay of the first link with respect to the second link at a second, different, wavelength, using the determined difference in the propagation delay at the first wavelength. The second wavelength can be a wavelength used to carry traffic. The method can use known parameters of the link such as: dispersion, dispersion slope.

In an alternative, the method can be performed at a plurality of different wavelengths, to give a value for the difference in the propagation delay of the first link with respect to the second link at each of a plurality of different wavelengths. The method can comprise determining a difference in the propagation delay of the first link with respect to the second link at a further wavelength, using the values of difference in propagation delay calculated at the plurality of wavelengths. Any suitable mathematical technique, such as quadratic interpolation, can be used.

The determined difference in the propagation delay of the first link with respect to the second link can be used by any layer using the communication network.

The communication network can be an optical network.

According to an embodiment, at least one of the measuring steps is performed at a wavelength that is normally used to carry traffic while the wavelength is carrying traffic. This can be achieved by using overhead data. In the case of the Optical Transport Network, suitable overhead data are Reserved (RES) bytes of the overhead or General Communication Channel (GCC) bytes of the overhead.

An aspect provides apparatus at a node of a communication network to perform any of the steps of the method. The apparatus is arranged to measure a round trip delay of the first link. The round trip delay can be measured by transmitting a test signal from the first node to the second node over the first link and receiving a reply to the test signal from the second node over the first link. The test signal can be applied to the first link by a tap, combiner, switch or any suitable mechanism. Similarly, a reply to the test signal can be applied to the first link by a tap, combiner, switch or any suitable mechanism.

The apparatus is arranged to measure a round trip delay of the second link. The round trip delay can be measured by transmitting a test signal to the second node over the second link and receiving a reply to the test signal from the second node over the second link. The test signal can be applied to the second link by a tap, combiner, switch or any suitable mechanism. Similarly, a reply to the test signal can be applied to the second link by a tap, combiner, switch or any suitable mechanism.

The apparatus further comprises a module for determining a difference in the propagation delay of the first link with respect to the second link using the measured round trip delays of the first link and the second link.

The apparatus can also comprise a module for measuring a delay incurred in a transmission path at the node. The apparatus can comprise a first element to apply a test signal from a module to the transmission path and a second element to forward the test signal from the transmission path to the module. The first and second elements can be positioned at an input to a transmission interface at a node and at an output of a transmission interface at a node, or at respective sides of one or more components in the transmission path which may incur a delay, such as at respective sides of an optical amplifier or other component in the transmission path. The first and second elements can be switches or filters.

The node can be a node of an optical communication network.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable instructions can be downloaded to the storage medium via a network connection.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which.

DETAILED DESCRIPTION OF EMBODIMENTS

Figure 2:
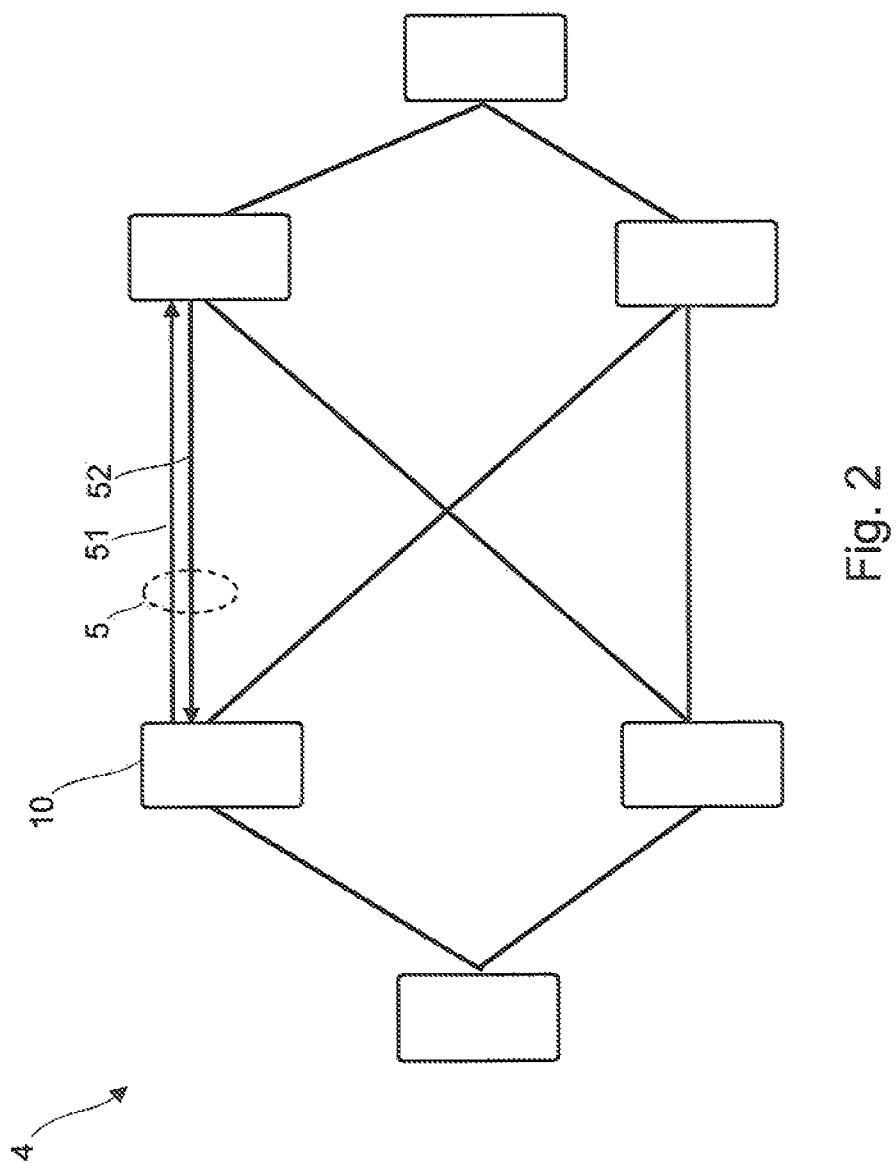
FIG. 2 depicts an example optical communication network, according to a particular embodiment.

FIG. 2 shows an optical communication network 2 comprising nodes 10. Adjacent nodes 10 of the network are connected by links 5. A separate link can be provided for each direction of communication: a first link for carrying traffic in the forward direction of communication and a second link for carrying traffic in the reverse direction of communication. Each link can be a separate fibre which can follow a physically separate path.

An embodiment of a system and method for measuring asymmetry between nodes will now be described with reference to FIGS. 3 to 7. This embodiment uses an Optical Supervisory Channel (OSC).

Figure 3:
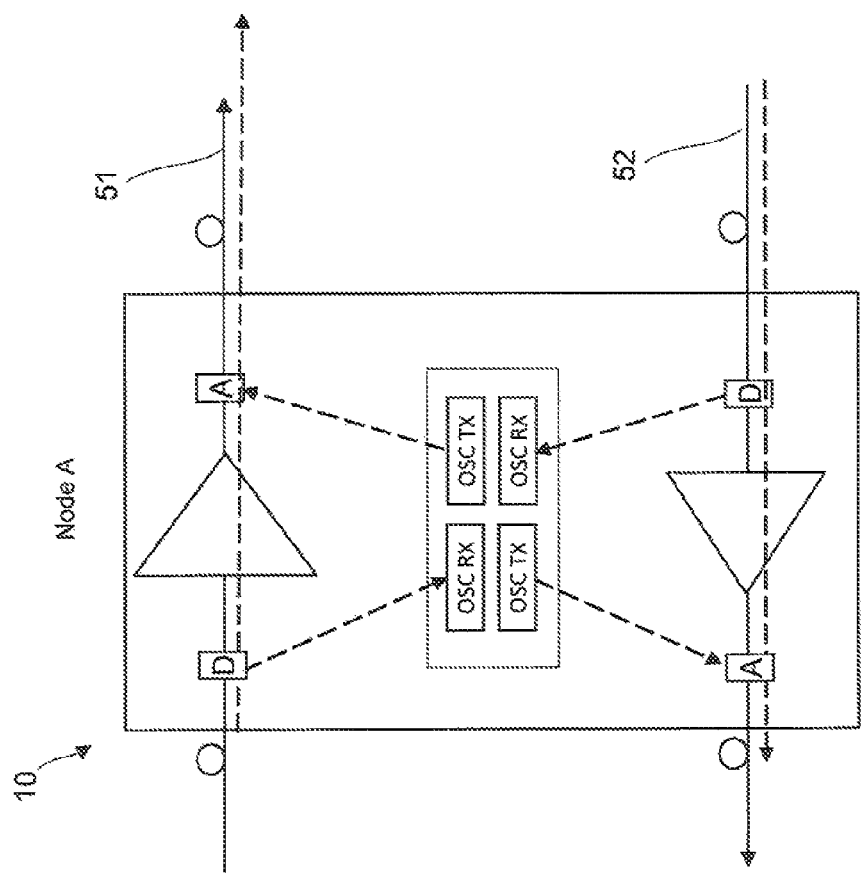
FIG. 3 depicts an example pair of adjacent nodes for supporting an Optical Supervisory Channel in an optical communication network, according to a particular embodiment.
Figure 4:
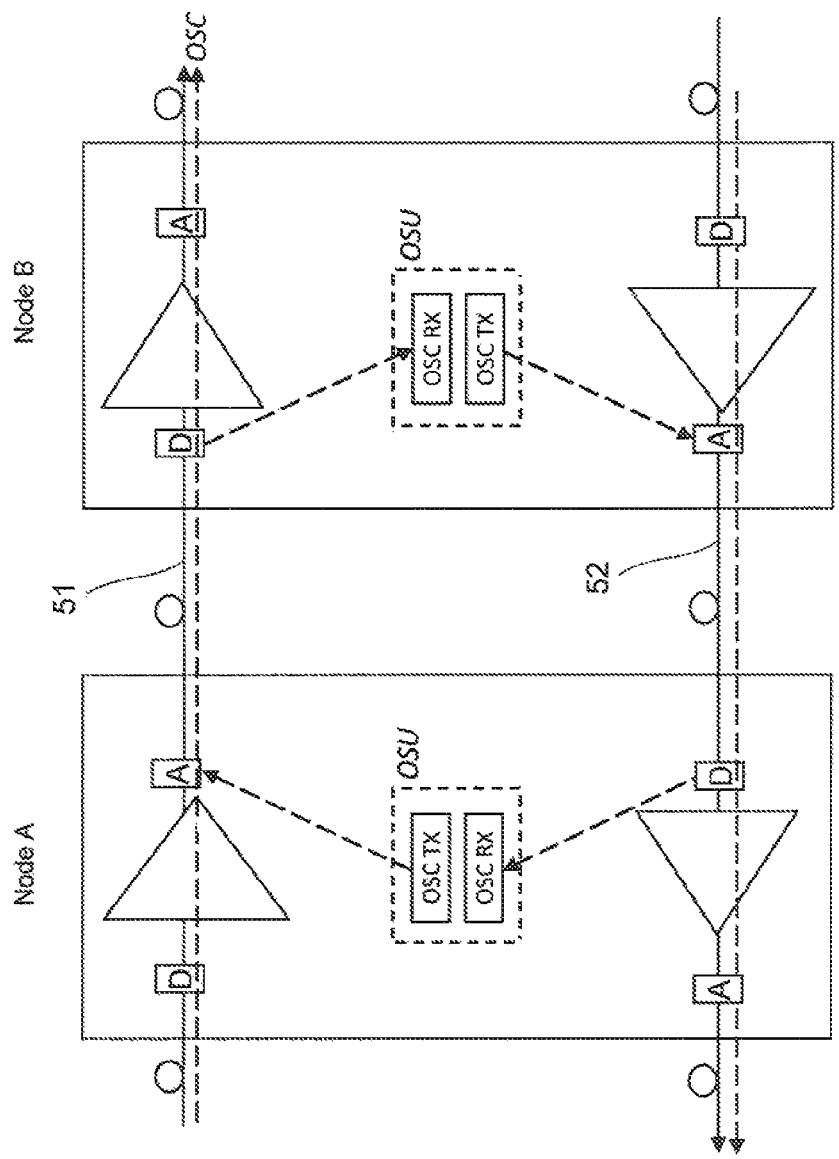
FIG. 4 depicts another example pair of adjacent nodes for supporting an Optical Supervisory Channel in an optical communication network, according to a particular embodiment.

FIGS. 3 and 4 show a pair of adjacent nodes 10 (Node A, Node B) of the optical transmission network 2. A link 51 connects Node A to Node B for carrying traffic in a forward direction (A-B) and a link 52 connects Node A to Node B for carrying traffic in a reverse direction (B-A). The two links 51, 52 can have different path lengths, which will incur different propagation delays when signals are sent over these links 51, 52.

FIGS. 3 and 4 show conventional apparatus provided at nodes to support an Optical Supervisory Channel (OSC). The OSC is an additional wavelength $\lambda_{OSC}$, usually outside the EDFA amplification band, (at 1510 nm, 1620 nm, 1310 nm or another proprietary wavelength) which carries information about the DWDM optical signal as well as remote conditions at the optical terminal or amplifier site. It is also normally used for remote software upgrades and network management information. The OSC signal structure is vendor specific even if the ITU standard suggests using an OC-3 signal structure. Unlike the 1550 nm band client signal-carrying wavelengths, the OSC is terminated at intermediate amplifier sites, where it receives local information before retransmission.

FIG. 4 shows two nodes connected by two fibre spans 51, 52 (one for each direction). The dashed lines depict the OSC between the two nodes during normal operation. OSC is dropped and added at each site using filters and RX/TX modules. Each intermediate node is equipped with a unit devoted to OSC termination. This unit can be called an Optical Supervisory Unit (OSU). A Dual OSU card can be provided to support an OSC in directions.

According to an embodiment of the invention, propagation delay is measured on a span-by-span basis. Such measurement can be performed at the beginning of the system operation and so the bandwidth reserved and the hardware installed for OSC can be used at the begin of network life without interfering with the following normal OSC operation. The method can be performed at other times, e.g. periodically during the lifetime of the network or after equipment at a node has been upgraded.

In particular the principle is based on the round trip delay calculation as for instance used with protocols like Network Time Protocol (NTP) and Precision Time Protocol (PTP).

Figure 5:
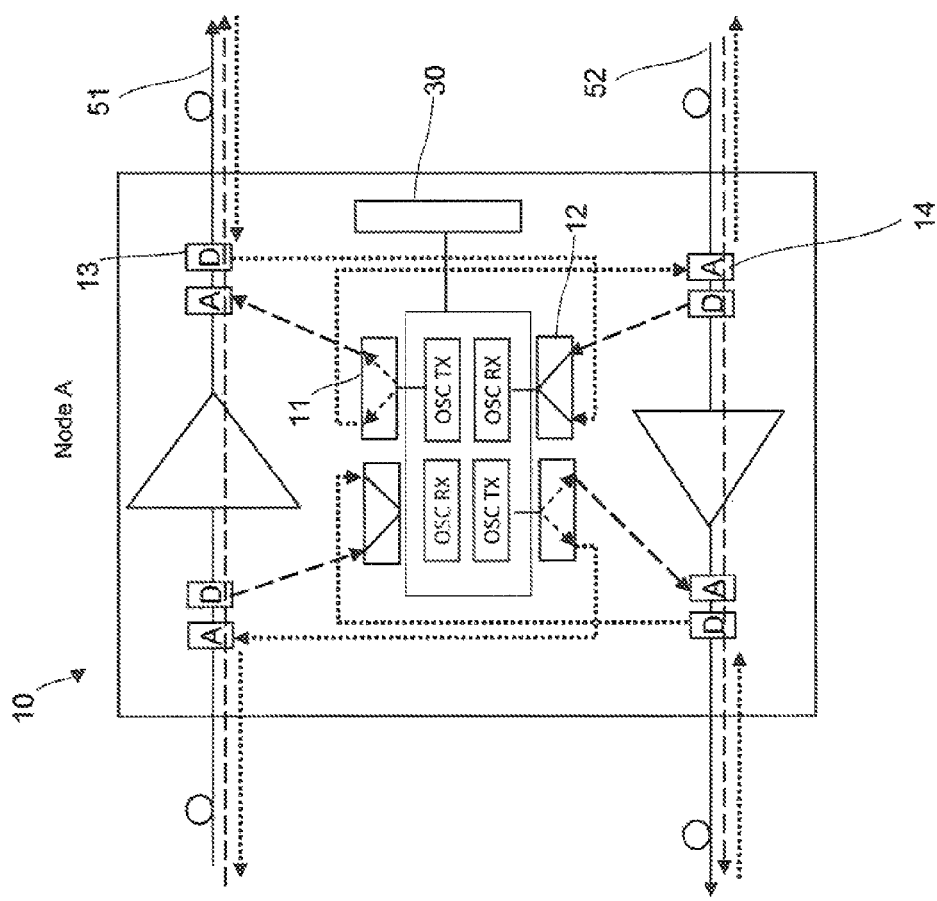
FIG. 5 depicts an example Optical Supervisory Unit, according to a particular embodiment.
Figure 6:
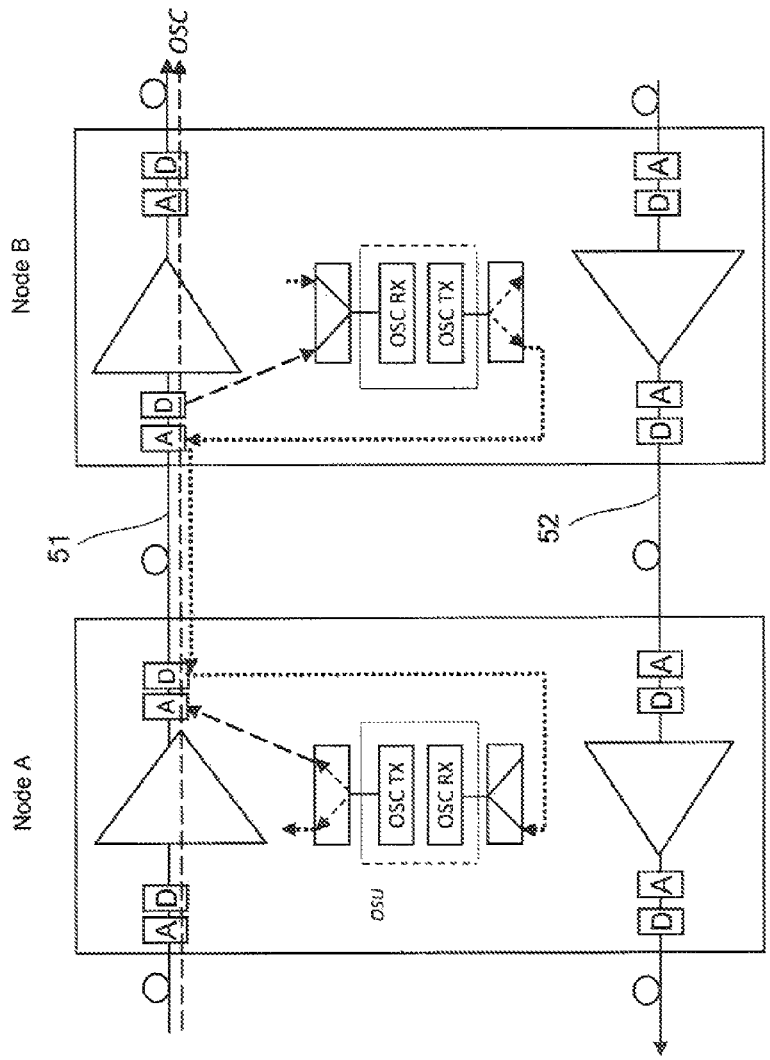
FIG. 6 depicts exemplary signal flows in an optical communication network, according to a particular embodiment.
Figure 7:
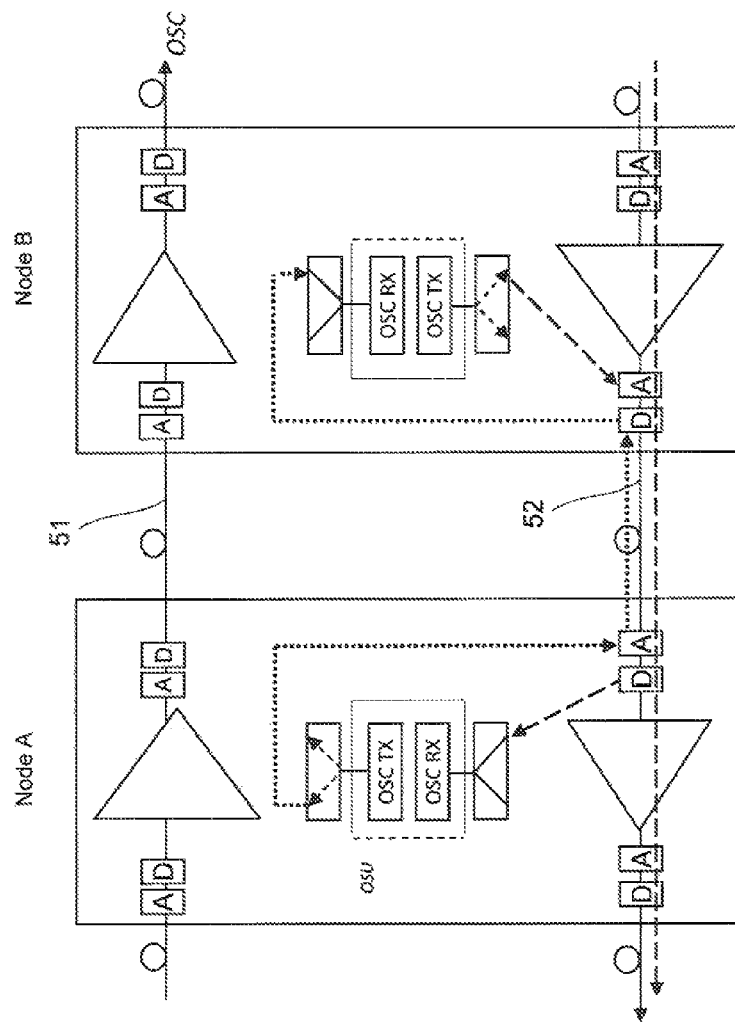
FIG. 7 depicts additional exemplary signal flows in an optical communication network, according to a particular embodiment.

FIG. 5 shows OSU functionality at a node 10 in accordance with an embodiment of the invention. FIG. 6 shows a pair of adjacent nodes with this functionality. FIG. 6 shows signal flows to measure link 51. FIG. 7 shows signal flows to measure link 52.

A method according to an embodiment of the invention will now be described. A first stage measures propagation delay on the first link 51. FIG. 6 shows signal flows. Dashed lines refer to signals sent in the normal, forward, direction of the OSC on link 51. Dotted lines refer to signals sent in the reverse direction, contrary to normal operation of the OSC on link 51.

At the time $T_0$ a test signal (e.g. a predefined sequence of data) is sent via the OSC channel from the OSC TX of node A to the OSC RX of node B via the first link 51.

The signal arrives in OSC RX of node B with a delay of $\Delta T_{AB}$ due to the propagation time in the fibre span from node A to node B. At this stage $\Delta T_{AB}$ is not measurable by node B because node A and B does not have a common time reference.

The OSU module, in node B, introduces an additional processing delay $\Delta T_B$ and then sends a response to A, via the first link 51, using its TX module. The data streaming from node B to node A runs on the same fibre 51 and contains the $\Delta T_B$ figure.

The signal arrives in OSC RX of node A with a delay of $\Delta T_{BA}$ introduced by the propagation time in the fibre span from node B to node A.

Node A now mark as $T_1$ the time in which the signal from node B is received. That is:

$$T_1 = T_0 + \Delta T_{AB} + \Delta T_B + \Delta T_{BA} \qquad (1)$$

Note that $T_0$ and $T_1$ are measured directly by node A while $\Delta T_B$ has been measured by node B and sent to node A embedded in the signal sent back to A. In addition it is possible to assume that $\Delta T_{AB} = \Delta T_{BA}$ and so node A can calculate the desired propagation delay at the wavelength of operation of the OSC channel $\lambda_{OSC}$:

$$\tau_{OSC} = \Delta T_{AB} = \Delta T_{BA} = (T_1 - T_0 - \Delta T_B)/2 \qquad (2)$$

The method is then repeated for the second link 52. Node A sends a test signal (e.g. a predefined sequence of data) via the OSC channel from the OSC TX of node A to the OSC RX of node B via the second link 52, and subsequently receives the signal via the second link 52, after retransmission by node B. FIG. 7 shows signal flows. Dashed lines refer to signals sent in the normal, reverse, direction of the OSC along link 52. Dotted lines refer to signals sent in the forward direction, contrary to normal operation of the OSC on link 52.

The two measurement stages described above provide:

$\Delta T_{AB\_51}$ (i.e. $\Delta T_{AB}$ for link 51)

$\Delta T_{AB\_52}$ (i.e. $\Delta T_{AB}$ for link 52)

where $\Delta T_{AB\_51}$ is not equal to $\Delta T_{AB\_52}$

From this, the offset (asymmetry) can be computed:

Offset = $\Delta \Delta T_{AB\_51} - \Delta T_{AB\_52}$

The offset is the difference in propagation delays between the two links 51, 52.

FIGS. 5-7 show additional apparatus at a node 10 to support the measurement. An additional switch 11 is provided on the output side of OSC TX and an additional add filter or tap 14 is provided in the path from link 52 to allow a test signal to be switched to link 52. An additional combiner 12 is provided on the input side of OSC RX and an additional drop filter 13 is provided in the OSU module to allow a test signal to be received from link 51.

The OSC operates at a well defined wavelength $\lambda_{OSC}$ which is different from the wavelength at which the DWDM traffic is transmitted. The value of $\tau_{OSC}$ estimated in (2) is valid at $\lambda_{OSC}$. Additional calculations are required to refer the propagation delay to the wavelength(s) used for traffic. If $\lambda$ represents one of the (e.g. 80) traffic-carrying wavelengths of the ITU grid, we have:

$$(\tau - \tau_{OSC}) = D^* L^* (\lambda - \lambda_{OSC}) \qquad (3)$$

Where D is a coefficient calculated as in the following, using dispersion and dispersion slope parameters, $D_{ref}$ and $S_{ref}$ (in ps/nm km and ps/nm² km respectively), provided in the data sheet of the fibre manufacturer for a reference wavelength $\lambda_{ref}$:

$$\lambda_0 = (\lambda + \lambda_{OSC})/2 \qquad (4)$$

$$D = D_{ref} + S_{ref}^* (\lambda_0 - \lambda_{ref}) \qquad (5)$$

L is the length of the fibre at installation. Finally the propagation delay at $\lambda$ is:

$$\tau = D^* L^* (\lambda - \lambda_{OSC}) + \tau_{OSC} \qquad (6)$$

If the dispersion in unknown and it is required to apply the proposed method to an arbitrary $\lambda$, a direct measurement of the delay can be made for a plurality of wavelengths (e.g. three wavelengths $\lambda_1$, $\lambda_2$, $\lambda_3$), where one of the plurality of wavelengths can be $\lambda_{OSC}$, according to the method explained above. Advantageously, the fixed laser (OSC TX) is replaced with a tunable laser and add/drop filters are replaced with tunable ones. If tunable lasers are already connected to the equipment, such three wavelengths could be selected among the ones on which the laser can be tuned. The delay for an arbitrary different X can be derived by any suitable technique, such as quadratic interpolation.

Referring again to FIG. 5, this shows a module 30 which is arranged to perform any of the calculations described above. Module 30 can include storage for storing results and parameters used in the calculations. Module 30 can control the OSU to perform the sequence of steps of the method. As an alternative to locally performing calculations at the node, the measurements can be sent to another node, such as a management node for calculation.

As an alternative to performing measurements using the OSC, the method can use an optical interface transmitting at a wavelength that is blocked by optical amplifiers or other optical equipment located at the two ends of an optical span, so that a measurement is performed on a span-by-span basis.

Figure 8:
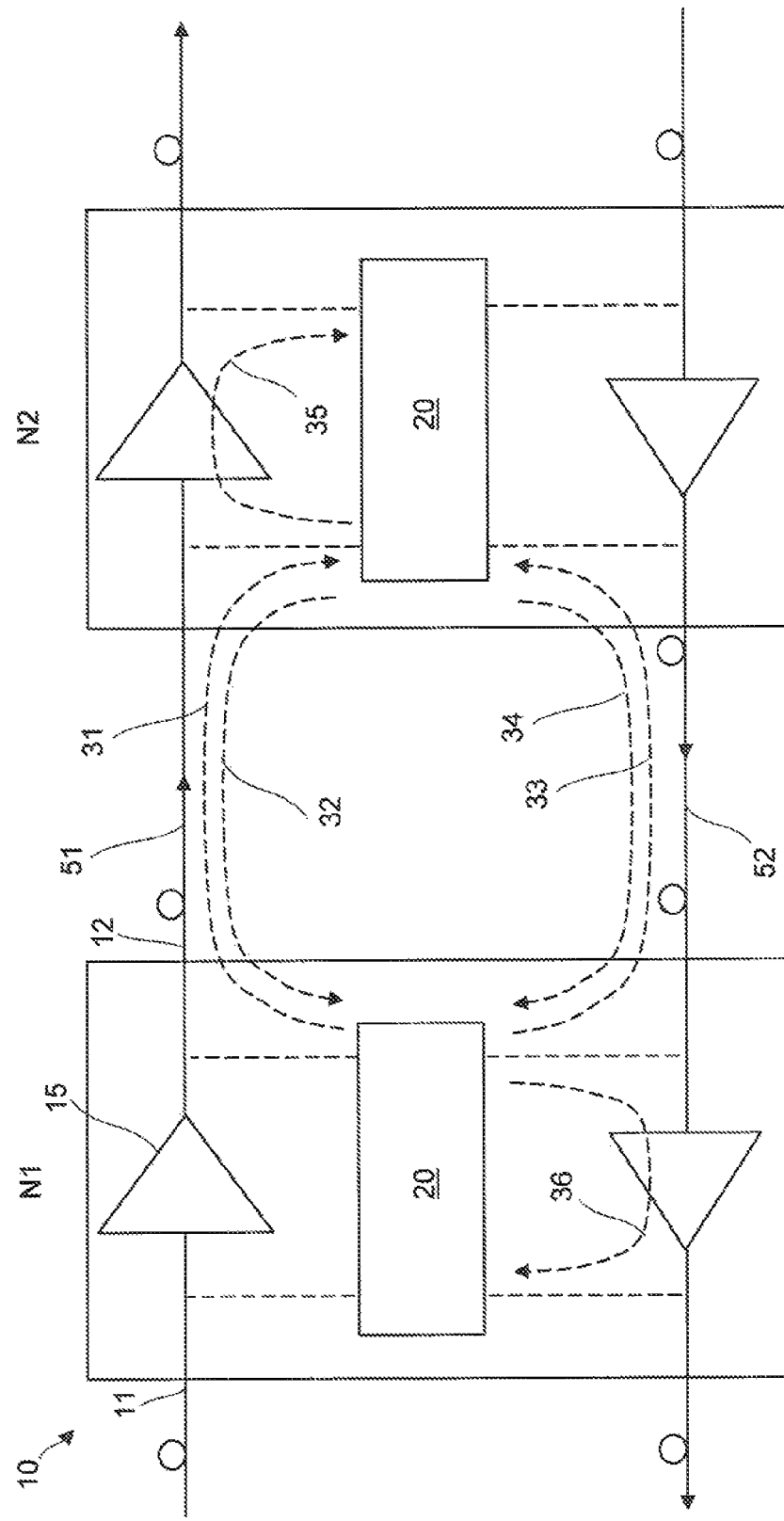
FIG. 8 depicts another example pair of adjacent nodes, according to an alternative embodiment.

Another embodiment of a system and method for measuring asymmetry between nodes will now be described with reference to FIGS. 8 to 12. FIG. 8 shows a pair of adjacent nodes 10 (Node N1, Node N2) of an optical transmission network 4, such as the network of FIG. 2. A link 51 connects Node 1 to Node 2 for carrying traffic in a forward direction (N1-N2) and a link 52 connects Node 1 to Node 2 for carrying traffic in the reverse direction (N2-N1). The two links 51, 52 can have different path lengths, which will incur different propagation delays when signals are sent over these links 51, 52 Apparatus 20 is provided at each node N1, N2 to measure link asymmetry.

Propagation delay can be measured on a span-by-span basis between pairs of nodes. Such measurement can be performed at the beginning of the system operation. The method can be performed at other times, e.g. periodically during the lifetime of the network, after equipment at a node has been upgraded or after a fault has occurred, for example.

The following method can measure the propagation delays introduced by fibre spans 51, 52 and optical nodes 10 in a network so that it is possible to compensate for asymmetries between the two propagation directions. Any node delay (e.g. due to dispersion compensating fibre) can also be measured. FIG. 8 shows signal flows during the method.

The method comprises:
measuring round-trip propagation delay over link 51 by:
1. Sending a signal (31) from an output port of node N1 to an input port of a subsequent node N2 in the same propagation direction to the channel wavelengths on link 51.
2. Sending a signal (32) from an input port of node N2 to an output port of the previous node N1, in the opposite propagation direction to the channel wavelengths on link 51 (i.e. opposite to the normal direction of link 51).

Processing delay at node N2 can be measured by node N2 and sent to node N1. Processing delay is the delay between receiving the test signal at node N2 and sending a signal at step 2.

measuring round-trip propagation delay over link 52 by:
3. Sending a signal (33) from an input port of node N1 to an output port of a subsequent node N2 in the opposite propagation direction to the channel wavelengths on link 52 (i.e. opposite to the normal direction of link 52).
4. Sending a signal (34) from an output port of node N2 to an input port of the previous node N1, in the same propagation direction as the channel wavelengths on link 52.

Processing delay at node N2 can be measured by node N2 and sent to node N1. Processing delay is the delay between receiving the test signal at node N2 and sending a signal at step 2.

The method can further comprise:
measuring delay at node N2 by:
1A. Sending a signal (35) from an input port of node N2 to an output port of the same node N2, in the same propagation direction as the channel wavelengths. The measured delay at node N2 can be sent to node N1.
measuring delay at node N1 by:
3A. Sending a signal (36) from an input port of node N1 to an output port of the same node N1, in the same propagation direction as the channel wavelengths.

Figure 11:
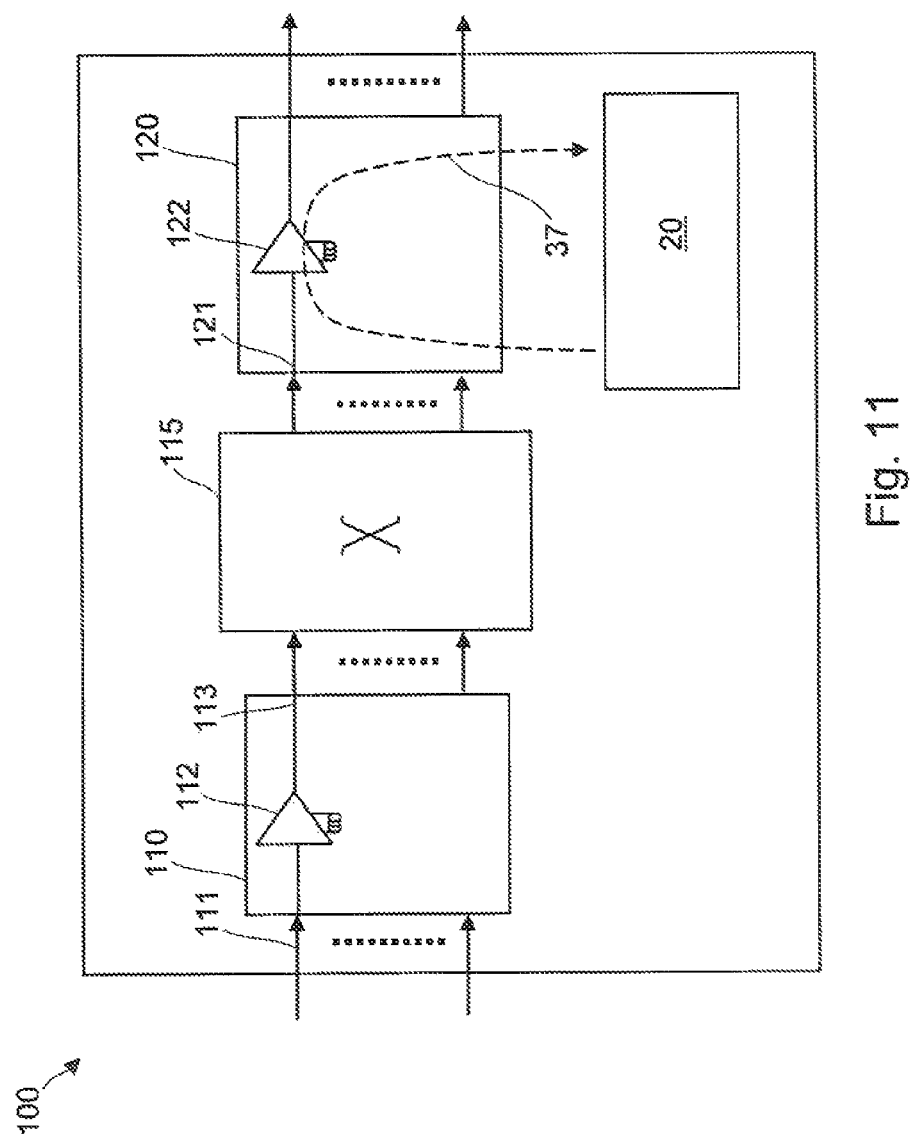
FIG. 11 depicts an example node with an input stage and an output stage, according to a particular embodiment.

Note: the "output port" in step 1A or step 3A can be internal to the node, as explained later with reference to FIG. 11.

Measurements acquired at steps 1-4 are used to estimate the difference in propagation delay of the fibre spans 51, 52. Measurements acquired at steps 1A and 3A indicate the delay introduced by the nodes N1 and N2 and can be used to refine the estimation of propagation delay. Measurements can be performed in various orders. For example, measuring delay at node N2 (step 1A) is advantageously performed after step 1A so that node N2 can send the measurement of node delay along with processing delay as part of the step of sending a signal at step 2. This minimizes the number of separate transmissions between node N2 and node N1. However, the measurement of delay at node N2 can be performed at another time, such as after step 2 or 4 or before step 1.

Measurements at steps 1-4 of the propagation delay between nodes can be made using a dedicated channel transmitted/received by optical interfaces at nodes N1, N2. This dedicated channel can be the Optical Supervisory Channel (OSC), or a channel which replaces the traditional Optical Supervisory Channel (OSC) in new networks. The wavelength used for measurement will be called an Optical Monitoring Channel (OMC). The frame structure and bit rate details for the data exchanged over this channel for the purpose of correcting for asymmetry, may be based on existing standardized format (e.g. as defined in G.709 in case of OTN networks).

Measurements at steps 1A and 3A of the delay within a node should advantageously occur at a wavelength within the amplification spectrum of the optical amplifier or, more generally, at a wavelength within the operating spectrum of whatever component in the transmission path is being measured.

Advantageously, all measurements are performed at the same wavelength for best accuracy and to simplify calculations. However, it is possible to perform round trip measurements at one wavelength, perform node delay measurements at another wavelength, and apply a correction factor to one of the types of measurement.

The method can be applied to any kind of node in an optical network, such as optical amplifiers, reconfigurable and fixed OADMs, etc.

The method can be repeated at multiple (e.g. three) different wavelengths in order to have a complete characterization of the delay vs. the wavelength spectrum. This can be achieved by using a tunable transmitter at the nodes N1, N2 can be used to emit at the different wavelengths.

Alternatively, the method can perform measurements at a single wavelength and the delay at different wavelengths can be calculated using fibre chromatic dispersion data.

Figure 9:
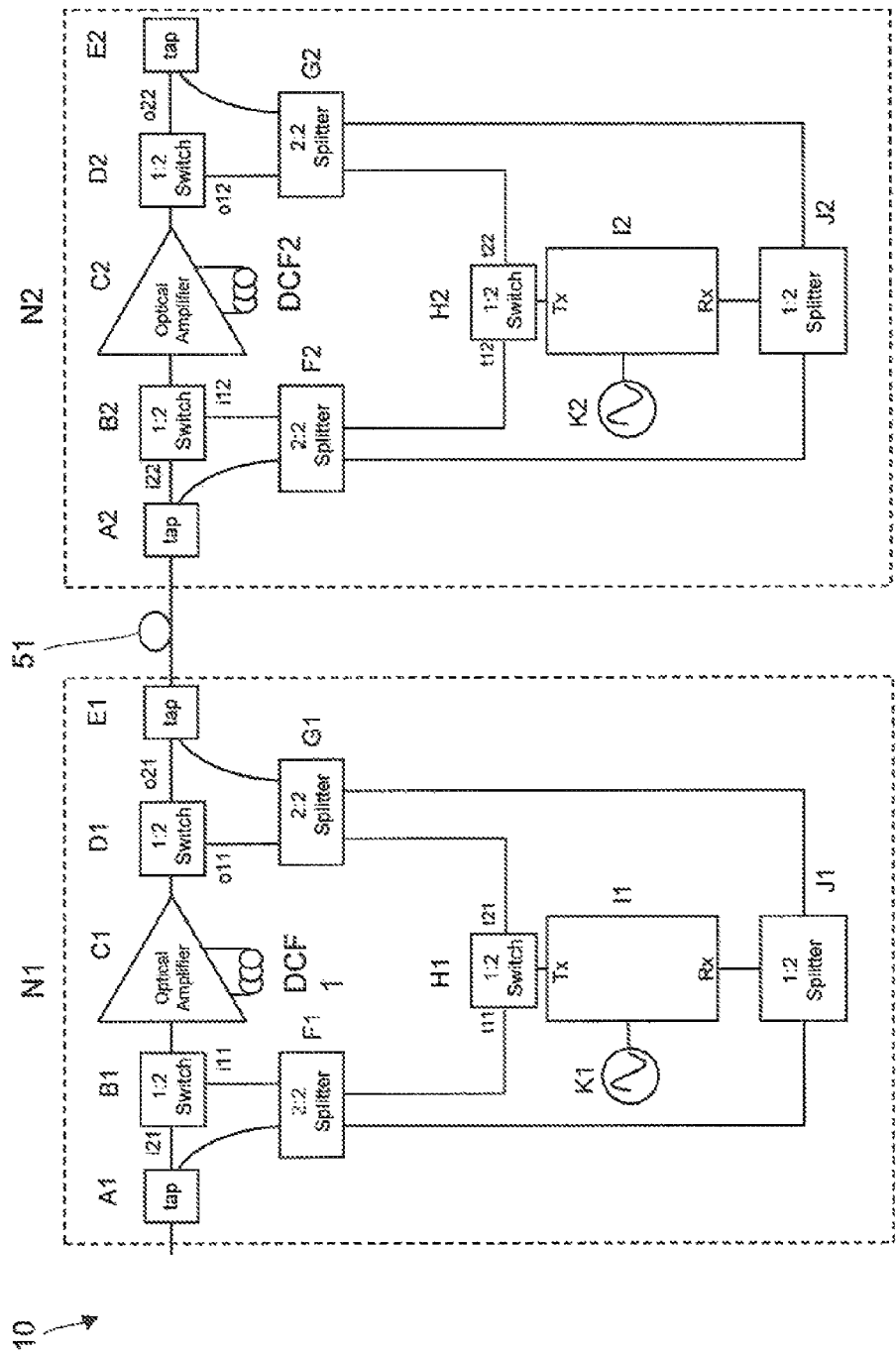
FIG. 9 depicts an example node architecture, according to a particular embodiment.

FIG. 9 shows an example of a node architecture to perform the method described above. FIG. 9 shows a node with an optical amplifier in the transmission path for sake of simplicity, although the node can comprise any kind of optical component, or combination of components.

Each node has access to an oscillator K1, K2 of sufficient accuracy which is used for measurements.

At node N1, switches B1, D1, H1, taps A1, E1 and splitters F1, G1, J1 are provided. Switches B1 and D1 allow the delay through the amplifier C1 of node N1 to be measured. Switch B1 forwards a test signal from module I1 to the input of the amplifier C1 and switches a signal output by amplifier C1 to the module I1. Tap E1 and splitter G1 allow a test signal from module I1 to be applied to link 51 and also allows a test signal received on link 51 to be forwarded to module I1. Tap A1 and splitter F1 perform a similar function for test signals sent/received between node N1 and a previous node (not shown).

At node N2, switches B2, D2, H2, taps A2, E2 and splitters F2, G2, J2 are provided. Switches B2 and D2 allow the delay through the amplifier C2 of node N2 to be measured. Switch B2 forwards a test signal from module I2 to the input of the amplifier C2 and switches a signal output by amplifier C2 to the module I2. Tap A1 and splitter F1 allow a test signal from module I2 to be applied to link 51 and also allows a test signal received on link 51 to be forwarded to module I2. Tap E2 and splitter G2 perform a similar function for test signals sent/received between node N2 and a following node (not shown).

FIG. 9 shows measurement apparatus for implementing steps 1, 2 and 1A of the method described above. Similar measurement apparatus is also provided at each node N1, N2 to implement steps 3, 4 and 3A.

The following steps correspond to those described above.
Step 1
An optical signal is transmitted from I1 Tx to I2 Rx, through H1 t21→G1→E1→Fibre Span→A2→F2→J2
Step 1A
An optical signal is transmitted from I2 Tx to I2 Rx, through H2 t12→F2→B2 i12→Optical Amplifier→D2 o12→G2→J2
Step 2
An optical signal is transmitted from I2 Tx to I1 Rx, through H2 t12→F2→A2→Fibre Span→E1→G1→J1

The states of the switches (on=closed, off=open) are summarized below:

|  | H1 | B1 | D1 | H2 | B2 | D2 |
|---|---|---|---|---|---|---|
| Regular operation | t11 off t21 on | i11 off i21 on | o21 on o11 off | t12 off t22 on | i12 off i22 on | o22 on o12 off |
| Step 1 (N1-N2) | t11 off t21 on | i11 on i21 off | o11 on[1] o21 off | t12 off t22 off | i12 on i22 off | o12 on[1] o22 off |
| Step 1A (delay at N2) | t11 on t21 off | i11 on i21 off | o21 off o11 on | t12 on t22 off | i12 on i22 off | o22 off o12 on |
| Step 2 (N2-N1) | t11 on t21 off | i11 off i21 off | o21 off o11 on | t12 on t22 off | i12 off i22 on | o22 off o12 on |

[1]The signal going from o11 into the optimal amplifier C1 is blocked by an optical isolator (not shown in the figure) present at the output port of C1. Similar considerations hold for different types of nodes.

The scheme in FIG. 4 does not contain wavelength-dependent devices and can be used with both single wavelength and tunable transmitters.

Figure 10:
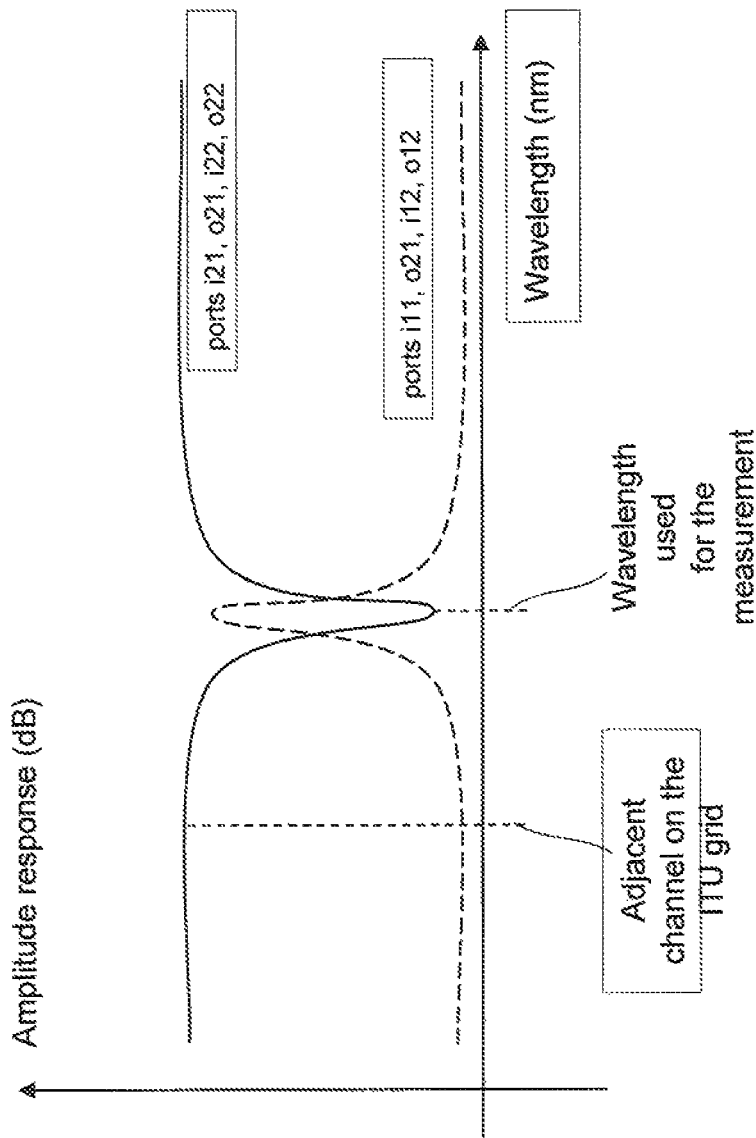
FIG. 10 depicts an example transfer function, according to a particular embodiment.

To allow in-service operation, switches B1, D1, B2, D2 can be replaced with tunable or fixed drop filters. A transfer function of a suitable filter is shown in FIG. 10. As described above, the method can be repeated at a set of different wavelengths, with tunable filters tuning to the particular wavelength in use at each point in time.

Measurement Method in Detail

The term Optical Monitoring Channel (OMC) will be used to refer to the wavelength at which a measurement is made.

With reference to FIG. 9:

At the time $T_0$ a predefined sequence of data is sent via the OMC channel from the OMC TX of node I1 to the OMC RX of I2 (step 1).

The signal arrives in OMC RX of I2 with a delay of $\Delta T_{12}$ due to the propagation time in the fibre span from node A to node B. $\Delta T_{12}$ is not measurable by node B because node A and B does not have a common time reference.

The OMC Module in Node 2 sends a second predefined sequence of data in this case via the relevant delay components of Node 2 (i.e. Optical Amplifier with the related DCF) and receives a delayed copy of the same sequence. In this way is able to measure the delay $\Delta T2$ added by its Optical Amplifier (step 1A)

Node 2 introduces an additional delay $\Delta T_{2proc}$, mainly due to signal processing in the OMC module, and then sends a response to 1 using its TX module in I2 (step 2). The data streaming from node 2 to node 1 runs on the same fibre and contains $\Delta T2_{proc}$ and $\Delta T2$ values.

The signal arrives in OMC RX of node 1 with a delay of $\Delta T_{21}$ introduced by the propagation time in the fibre span from node 2 to node 1.

Node 1 now marks as $T_1$ the time in which the signal from node 2 is received.

That is:

$$T_1 = T_0 + \Delta T_{12} + \Delta T_{2proc} + \Delta T_{21}$$

Note that $T_0$ and $T_1$ are measured directly by node 1 while $\Delta T_2$ and $\Delta T_{2proc}$ have been measured by node 2 and sent to node 1 embedded in the signal sent back to 1. In addition it's possible to assume that $\Delta T_{12} = \Delta T_{21}$ and so node 1 can easily calculate the desired propagation delay at the wavelength of operation of the OMC channel $\lambda_{OMC}$:

$$\tau_{OMC} = \Delta T_{12} + \Delta T2 = (T_1 - T_0 - \Delta T_{2proc})/2 + \Delta T2$$

Note: the additional internal delays due to the OMC module is not impacting the measurement as in the end what is important is to calculate the difference between the delay in one fibre with the delay in a second fibre. These internal delays will be identical and will disappear once calculating the difference.

The method is then repeated for the second link 52. Node N1 sends a test signal (e.g. a predefined sequence of data) via the OMC channel to node N2 via the second link 52, and subsequently receives a reply to the signal via the second link 52, after retransmission by node B.

The steps described above provide two measurements:

$\Delta T_{51} = \tau_{OMC}$ calculated for link 51
$\Delta T_{52} = \tau_{OMC}$ calculated for link 52

From this, the offset (asymmetry) can be computed:

$$\text{Offset} = \Delta T_{51} - \Delta T_{52}$$

The offset is the difference in propagation delays between the two links 51, 52.

Figure 12:
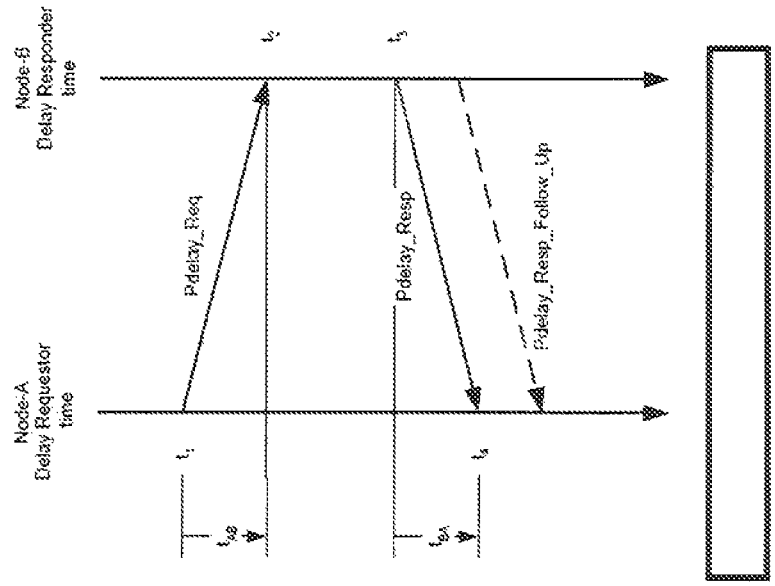
FIG. 12 depicts an example sequence of messages for obtaining measurement of propagation delay over a single fibre, according to a particular embodiment.

A sequence of messages similar to the IEEE1588 Pdelay_Req and Pdelay_Resp could be used to obtain measurement of propagation delay over a single fibre, as shown in FIG. 12. The four time stamps $t_1$, $t_2$, $t_3$ and $t_4$ would provide the information on the propagation delay on the fibre where $\Delta T_B = (t_3 - t_2)$.

Advantageously, all nodes involved in this process shall implement an oscillator with sufficient accuracy. If the network supports synchronous Ethernet, access to an accurate reference will be available. If there is no accurate frequency reference available on the line (e.g. as normally is the case for OTN networks), the free-running accuracy of the oscillator in the node involved in the measurement should be at least within a few ppm (e.g. similar to the accuracy that can be provided by the oscillator used to implement the G.813 or G.8262 clocks). In fact assuming the data exchange is completed in 1 ms, in the end the error introduced by the oscillator would be in the order of few ns and should still be acceptable (e.g. 4.6 ppm over 1 ms would result in 4.6 ns).

Figure 1:
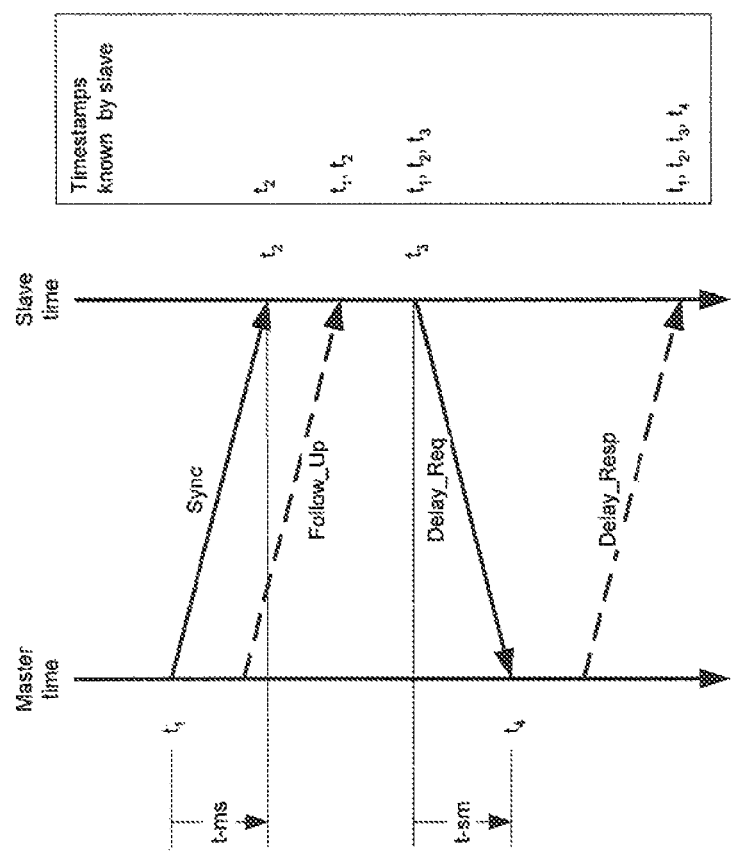
FIG. 1 depicts an example scheme relating time distribution via Precision Time Protocol, according to a particular embodiment.

The OMC operates at a well-defined wavelength $\tau_{OMC}$ which is different from the wavelength at which the DWDM traffic is transmitted. The value of $\tau_{OMC}$ estimated in (2) is valid at $\tau_{OMC}$: additional calculations are required to evaluate the propagation delay related to the wavelength(s) really used for traffic. Alternatively, fibre dispersion parameters could be experimentally estimated running the aforementioned steps at three different wavelengths, e.g. by using tunable lasers, Several implementations are possible for the setup in FIG. 1, based on optical switches or fixed or tunable add drop filters. Depending on the implementation, in service operation is possible for all the steps of the method.

The method provides a propagation delay $\tau_f$ for the forward link 51 and a reverse propagation delay $\tau_r$ for the reverse link 52. The difference $(\tau_f - \tau_r)$ can be used in the evaluation of the delay asymmetry to be used in the time recovering process. In particular, the delayAsymmetry parameter defined in IEEE1588 is half of the difference $(\tau_f - \tau_r)$. Note that according to IEE15888 the delayAsymmetry parameter is defined to be positive when the master-to-slave or responder-to-requestor propagation time is longer than the slave-to-master or requestor-to-responder propagation time.

If a Boundary Clock is implemented in every node, the compensation can be performed locally where the PTP flow is processed. For the generic case where IEEE1588 is processed outside the transport network (e.g. at the borders of the OTN network) some means is provided in order to make the asymmetry compensation values available at the point in the network where the PTP packets are processed. As the asymmetry compensation is a process only required only at start up, or during rearrangements in the network, there would not be particular timing constraints for the distribution of these data. As an example, the data could be distributed via the control plane.

Some additional processing can be performed if the measurement process uses a wavelength which is different from the wavelength at which delay needs to be calculated. If λ represents one of the (e.g. 80) traffic-carrying wavelengths of the ITU grid, we have:

$$(\tau - \tau_{OSC}) = D * L * (\lambda - \lambda_{OMC})$$

Where D is a coefficient calculated as in the following, using dispersion and dispersion slope parameters, $D_{ref}$ and $S_{ref}$ (in ps/nm km and ps/nm² km respectively), provided in the data sheet of the fibre manufacturer for a reference wavelength $\lambda_{ref}$:

$$\lambda_0 = (\lambda + \lambda_{OMC})/2$$

$$D = D_{ref} + S_{ref} * (\lambda_0 - \lambda_{ref})$$

L is the length of the fibre at installation. Finally the propagation delay at λ is:

$$\tau = D * L * (\lambda - \lambda_{OMC}) + \tau_{OMC}$$

If the dispersion in unknown and it is required to apply the proposed method to an arbitrary λ, a direct measurement of the delay can be made for a plurality of wavelengths (e.g. three wavelengths $\lambda_1, \lambda_2, \lambda_3$), where one of the plurality of wavelengths can be $\lambda_{OMC}$, according to the method explained above. The delay for an arbitrary different λ can be derived by any suitable technique, such as quadratic interpolation. A more accurate correction might be done by using the Sellmeier equations for the fibre chromatic dispersion (see G.650 and G.652).

Measurement module 20 is arranged to perform any of the calculations described above. Module 20 can include storage for storing results and parameters used in the calculations. As an alternative to locally performing calculations at the node, the measurements can be sent to another node, such as a management node for calculation.

Embodiments have an advantage of not requiring manual compensation for asymmetries in the fibre. This process is currently only handled manually and the related costs might become unbearable once the IEEE1588 technology is implemented in the telecom networks.

In FIG. 9, the apparatus provided at node N1 supports measurement of propagation delay between nodes N1 and N2 and also supports measurement of propagation delay between node N1 and a previous node (not shown). This allows a single module I1 to be used for both spans. In an alternative embodiment, there is apparatus dedicated to each span (i.e. just to measuring node N1-N2).

In FIG. 9, the apparatus provided at node N1 supports measurement of propagation delay along link 51 between nodes N1 and N2. Additional apparatus is provided at node N1 to support measurement of propagation delay along link 52 between nodes N1 and N2. In an alternative embodiment, apparatus with a single module I1 can selectively connect to link 51 and to link 52. In another alternative embodiment, apparatus with a single module I1 can selectively connect to any of: link 51; link 52; the span between nodes N1-N2; and the span between node N1 and a previous node.

Referring again to FIG. 9, this shows a node 10 with an input 11, an output 12 and a component 15 such as an optical amplifier in the transmission path connecting the input 11 and output 12. Delay incurred by the component 15 at node N1 can be calculated as part of the measurement process between node N0 (the node preceding N1) and N1. FIG. 11 shows a node such as an OADM with an input stage 110 and an output stage 120 interconnected by a switch 115. Any delay incurred by components 122 in the output stage of the node can be calculated by an additional measurement step using the signal path 37. Delay incurred by the component 112 at node 200 can be calculated as part of the measurement process between the preceding node and node 200, where the "output port" of step 1A can be an internal output port 113 of node 100. Similarly, for links in the opposite direction, any delay incurred by components at each of an input stage and an output stage of the node can be calculated. In general, asymmetry is evaluated between each pair of fibres used to exchange timing information, and can include delay incurred at any part of a node.

The measurements for asymmetry compensation can be performed at start up of the network or during/following rearrangements of the network (in case these rearrangements would require the updating of the asymmetry compensation).

It can be advantageous to use a media that is not used by traffic (especially to handle rearrangements), such as the OSC. Using the OSC for delay compensation measurements during the normal operation of the network would make the OSC unavailable during the short periods it is used for these measurements, but this should not be a problem. An alternative approach is to dedicate a specific traffic channel (wavelength, lambda) for these measurements. An example of this has been described above, where the dedicated wavelength is called the Optical Monitoring Channel (OMC). In this case, the dedicated channel could be used during normal operation of the network without stopping other traffic or OSC traffic.

In some cases it might not be desirable to dedicate an additional traffic channel for this measurement, e.g. to simplify the set up of the network or to limit the impact on the capacity of links. A wavelength that carries traffic can be used for the measurements. To perform measurements in the same direction as traffic flow over the link (e.g. direction N1-N2 over link 51 in FIG. 8), some of the Overhead RES bytes can be used in case the measurement is made by a node that terminates that frame (e.g. in case of OTN, the GCC bytes in the OTN overhead). To perform measurements in the opposite direction as traffic flow over the link (e.g. direction N2-N1 over link 51 in FIG. 8) one of the lambdas that is used in the other fibres could be used (but this may not always be desired due to interferences and a new lambda different from any of the lambdas used for traffic should be used). The data could be carried in the overhead (e.g. GCC bytes in the OTN overhead).

Delay Compensation Due to the Use of Different Wavelengths

Figure 13A:
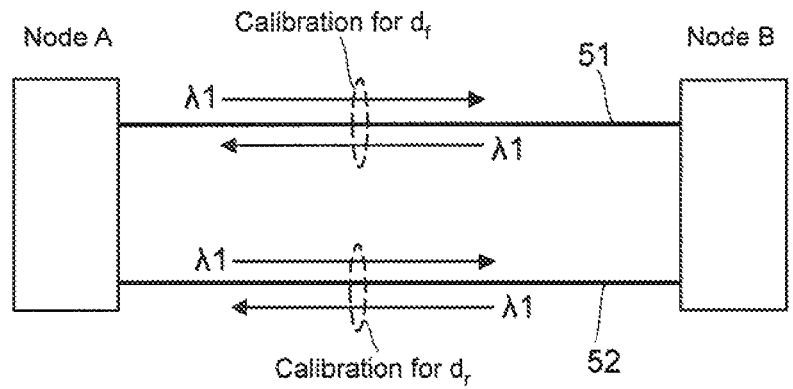
FIG. 13A depicts an example set of measurements to determine propagation delay, according to a particular embodiment.

The measurement procedure is performed on both fibres (i.e. the fibre 51 used in the forward direction and in the fibre 52 used for the reverse direction). FIG. 13A shows signalling to obtain a calibration of the forward propagation delay $d_f$ and signalling to obtain a calibration of the reverse propagation delay $d_r$.

Advantageously, a full set of measurements to determine propagation delay are performed at one wavelength. This is illustrated in FIG. 13A. All measurements are performed at a wavelength λ1. Wavelength λ1 can be the wavelength which carries the OSC, a dedicated measurement channel (such as the OMC described above or a traffic channel dedicated to measurement), or a traffic channel which is used to make measurements while carrying traffic. If the measurement process uses a wavelength which is different from the wavelength at which a value of propagation delay is required, then an adjustment can be made to compensate for different optical properties at the two wavelengths. For example, in FIG. 13A all measurements are performed at a wavelength λ1 and the wavelength at which a value of propagation delay is required is a different wavelength, say λn. The value of propagation delay calculated at wavelength λ1 can be compensated to obtain a value at the required wavelength λn.

Figure 13B:
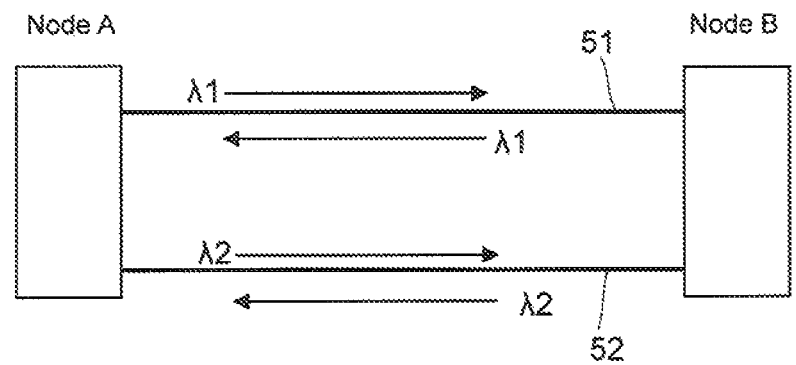
FIG. 13B depicts an example scenario wherein different measurements are detected at different wavelengths, according to a particular embodiment.
Figure 13C:
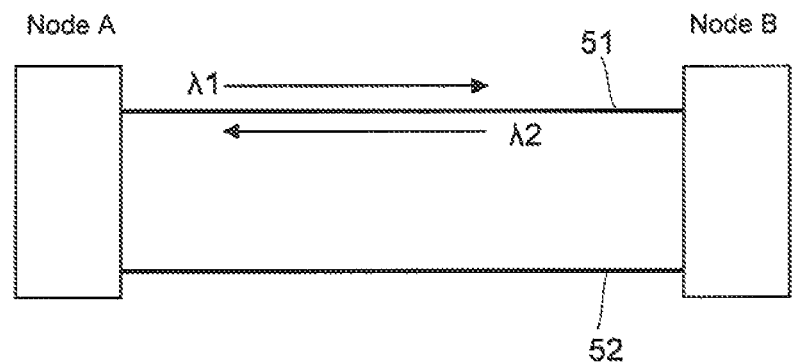
FIG. 13C depicts another example scenario wherein different measurements are detected at different wavelengths, according to a particular embodiment.

There can be situations where it is not possible to perform a full set of measurements at one wavelength. FIG. 13B shows an example situation where measurements on link 51 are made at a wavelength λ1 and measurements on link 52 are made at a wavelength λ2. The measurements can be compensated to account for this difference. As in FIG. 13A, if a value of propagation delay is required at a wavelength which is different from the ones used to make measurements, then a further compensatory adjustment can be made. FIG. 13C shows another example situation where different wavelengths are used. A measurement in the forward direction (A-B) is made at wavelength λ1 and a measurement in the reverse direction (B-A) is made at wavelength λ2. The propagation delay for link 51 can be adjusted to compensate for the different wavelengths used to make the measurements. In FIGS. 13B and 13C wavelengths λ1, λ2 can be the wavelength which carries the OSC, a dedicated measurement channel (such as the OMC described above or a traffic channel dedicated to measurement), or a traffic channel which is used to make measurements while carrying traffic.

It should be noted that the use of different wavelengths on the two fibres 51, 52 (or in a single fibre in the case of a transmission system using a single fibre) would result in different propagation delays, even if the two fibres have the same length. The above description explains two methods for estimating the group delays at different wavelengths. The first method uses a fixed wavelength transmitter (e.g. using the OSC/OMC), and uses chromatic dispersion data (e.g. known from optical fibre data-sheet) to compensate the measurement for the wavelength of interest. The second method is based on direct delay measurement at a set of three (or more) different wavelengths (e.g. using a tuneable transmitter). This allows propagation delay to be calculated at any desired wavelength by quadratic interpolation between the values obtained at the set of different wavelengths.

A calculation related to the different wavelengths compensation is described above (see equations 3-5). A more accurate estimation is given in OSC delay variation in G.652 fibres. It should be possible to define an appropriate limit for the maximum error that can be accepted for this measurement. Another, more general, relationship is given below.

Asymmetry Compensation for Use of Different Wavelengths

The compensation of asymmetry due to the use of different wavelength is obtained by calculating the group delay applicable to wavelengths used in the forward and in the reverse direction.

Indicating with A the asymmetry, the following applies:

$$A = d_f - d_r = L^*(n_r - n_f)/c,$$

Where L is the distance, c is the speed of light, $d_f$ and $d_r$ are the forward and reverse transmission delay, and $n_r$ and $n_f$ are the group refractive indexes applicable at the wavelength used in the forward and reverse direction respectively.

The evaluation of the refractive indexes can be done either using known chromatic dispersion data (e.g. from the optical fibre data-sheet) or, in case the dispersion in unknown, making a direct delay measurement at three different wavelengths (the refractive index for an arbitrary wavelength can then be derived by quadratic interpolation).

These data can then be used to derive the group delay of a generic wavelength. In particular in case of a G.652 compliant fibre the group delay at the applicable wavelengths can be calculated making use of the Sellmeier equations as described in G.652.

Figure 14:
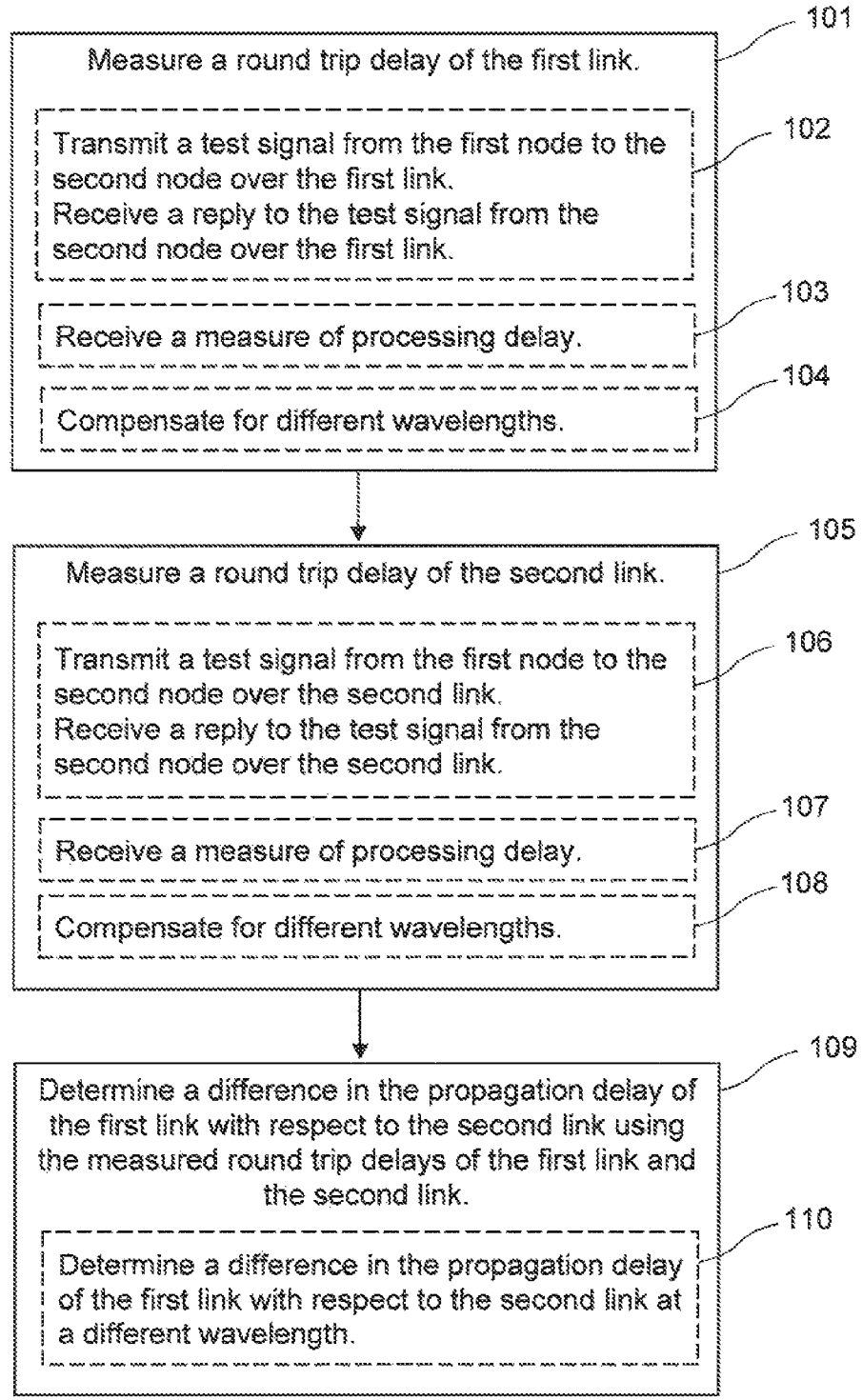
FIG. 14 depicts an example method for measuring asymmetry in propagation delay of first and second links in a communication network, according to a particular embodiment.

FIG. 14 shows a method for measuring asymmetry in propagation delay of first and second links which connect a first node to a second node of a communication network. Step 101 comprises measuring a round trip delay of the first link. This can comprise a step 102 of transmitting a test signal from the first node to the second node over the first link and receiving a reply to the test signal from the second node over the first link. Additionally, step 103 can receive a measure of processing delay, performed by the second node. If different wavelengths have been used for the test signal and reply at step 102, step 104 can compensate for this. Step 105 comprises measuring a round trip delay of the second link. This can comprise a step 106 of transmitting a test signal from the first node to the second node over the second link and receiving a reply to the test signal from the second node over the second link. Additionally, step 107 can receive a measure of processing delay, performed by the second node. If different wavelengths have been used for the test signal and reply at step 106, step 108 can compensate for this. If different wavelengths have been used for the measurements made at step 101 and 105, step 108 can compensate for this. Step 109 determines a difference in the propagation delay of the first link with respect to the second link using the measured round trip delays of the first link and the second link. If propagation delay is required at a different wavelength, then step 110 determines a difference in the propagation delay of the first link with respect to the second link at a different wavelength.

A method is described for measuring asymmetry in propagation delay of first and second links which connect nodes of a communication network. The method comprises transmitting a test signal to the second node over the first link and measuring a first link round trip delay taken to receive the test signal from the second node over the first link. The method further comprises transmitting a test signal to the second node over the second link and measuring a second link round trip delay taken to receive the test signal from the second node over the second link. The method further comprises determining a difference in the propagation delay of the first link with respect to the second link using the first link round trip delay and the second link round trip delay.

The communication network can be an optical network. The test signal can be transmitted over an Optical Supervisory Channel of the optical network.

The method can determine a difference in the propagation delay of the first link with respect to the second link at a first wavelength (e.g. a wavelength used to carry the OSC) and can then determine a difference in the propagation delay of the first link with respect to the second link at a second, different, wavelength, using the determined difference in the propagation delay at the first wavelength. The second wavelength can be a wavelength used to carry traffic. The method can use known parameters of the link such as: dispersion, dispersion slope.

In an alternative, the method can be performed at a plurality of different wavelengths, to give a value for the difference in the propagation delay of the first link with respect to the second link at each of a plurality of different wavelengths. One of the plurality of wavelengths can be a wavelength used to carry the OSC. The method can comprise determining a difference in the propagation delay of the first link with respect to the second link at a further wavelength, using the values of difference in propagation delay calculated at the plurality of wavelengths. Any suitable mathematical technique, such as quadratic interpolation, can be used.

The determined difference in the propagation delay of the first link with respect to the second link can be used by any layer using the communication network.

An aspect provides a node of a communication network comprising an interface to a first link and an interface to a second link. The first link and second link connect the node to a second node. The node is arranged to transmit a test signal to the second node over the first link and measure a first link round trip delay taken to receive the test signal from the second node over the first link. The node is further arranged to transmit a test signal to the second node over the second link and measure a second link round trip delay taken to receive the test signal from the second node over the second link. The node can be arranged to determine a difference in the propagation delay of the first link with respect to the second link using the first link round trip delay and the second link round trip delay.

The node can be a node of an optical communication network. The test signal can be transmitted over an Optical Supervisory Channel of the optical communication network.

The node can comprise a transmitter which is arranged to selectively transmit on the first link and the second link. The node can comprise a receiver which is arranged to receive from the first link and the second link. The first link is normally used to send traffic, and the node can comprise a drop function for extracting a wavelength carrying the test signal from the first link. The second link is normally used to receive traffic, and the node can comprise an add function for adding a wavelength carrying the test signal to the second link.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method for measuring asymmetry in propagation delay of first and second links which connect a first node to a second node of a communication network comprising:
    measuring a round trip delay of the first link;
    measuring a round trip delay of the second link;
    determining a forward propagation delay (df) of the first link from the first node to the second node based on the measured round trip delay of the first link;
    determining a reverse propagation delay (dr) of the second link from the second node to the first node based on the measured round trip delay of the second link;
    determining a difference between the forward propagation delay of the first link and the reverse propagation delay of the second link.

2. A method according to claim 1 wherein at least one of the measuring steps is performed at a wavelength that is normally used to carry traffic.

3. A method according to claim 1 wherein at least one of the measuring steps is performed at a wavelength, while the wavelength is carrying traffic.

4. A method according to claim 3 wherein the at least one of the measuring steps uses overhead data.

5. A method according to claim 1 wherein at least one of the measuring steps is performed at a dedicated wavelength.

6. A method according to claim 1 wherein at least one of the measuring steps is performed at a wavelength used to carry an Optical Supervisory Channel.

7. A method according to claim 1 further comprising compensating for at least one of:
    different wavelengths used in measuring the round trip delay of the first link;
    different wavelengths used in measuring the round trip delay of the second link;
    a different wavelength used in measuring a round trip delay of the second link compared to a wavelength used in measuring a round trip delay of the first link.

8. A method according to claim 1 wherein the step of measuring round trip delay of the first link comprises transmitting a test signal from the first node to the second node over the first link and receiving a reply to the test signal from the second node over the first link.

9. A method according to claim 8, wherein the reply from the second node comprises a delay measured in the test signal by the second node.

10. A method according to claim 1 wherein the step of measuring a round trip delay of the second link comprises transmitting a test signal to the second node over the second link and receiving a reply to the test signal from the second node over the second link.

11. A method according to claim 10 further comprising:
    measuring a processing delay incurred at the second node between receiving the test signal and sending a reply to the test signal; and,
    using the processing delay when determining a difference in the propagation delay of the first link with respect to the second link.

12. A method according to claim 1 further comprising measuring a delay incurred in a transmission path at the second node.

13. A method according to claim 12 wherein the step of measuring a delay incurred in a transmission path at the second node comprises measuring delay caused by at least one of: an optical amplifier, a dispersion compensation fibre.

14. A method according to claim 1 wherein the step of determining a difference in the propagation delay of the first link with respect to the second link determines a difference in the propagation delay of the first link with respect to the second link at a first wavelength and the method further comprises determining a difference in the propagation delay of the first link with respect to the second link at a second, different, wavelength, using the determined difference in the propagation delay at the first wavelength.

15. A method according to claim 1 wherein the step of determining a difference in the propagation delay of the first link with respect to the second link is performed at a plurality of different wavelengths and the method further comprises determining a difference in the propagation delay of the first link with respect to the second link at a further wavelength, using the values of difference in propagation delay calculated at the plurality of wavelengths.

16. A method according to claim 1 wherein the first link comprises a first optical fibre and the second link comprises a second optical fibre.

17. A method according to claim 1, wherein:
    measuring the round trip delay of the first link comprises:
        transmitting, from an output port of the first node, a first test signal in a first propagation direction to the second node; and
        receiving, at the output port of the first node, a first reply to the test signal from the second node, the first reply received from a second propagation direction that is opposite the first propagation direction.

18. A first network node of a communication network, the network node configured to measure asymmetry in propagation delay of first and second links connecting the first network node to a second network node, the first network node comprising:
- an input port coupled to the first link;
- an output port coupled to the second link; and
- an optical supervisory unit operable to:
  - measure a round trip delay of the first link;
  - measure a round trip delay of the second link;
  - determine a forward propagation delay (df) of the first link from the first node to the second node based on the measured round trip delay of the first link;
  - determining a reverse propagation delay (dr) of the second link from the second node to the first node based on the measured round trip delay of the second link;
  - determining a difference between the forward propagation delay of the first link and the reverse propagation delay of the second link.

19. A computer-readable storage medium, having stored thereon a computer program executable by at least one processor to cause the at least one processor to:
- measure a round trip delay of the first link;
- measure a round trip delay of the second link;
- determine a forward propagation delay (df) of the first link from the first node to the second node based on the measured round trip delay of the first link;
- determine a reverse propagation delay (dr) of the second link from the second node to the first node based on the measured round trip delay of the second link; and
- determine a difference between the forward propagation delay of the first link and the reverse propagation delay of the second link.

* * * * *